June 29, 1937.    M. A. TRAINER    2,085,556
TELEVISION SYSTEM
Filed Aug. 6, 1932
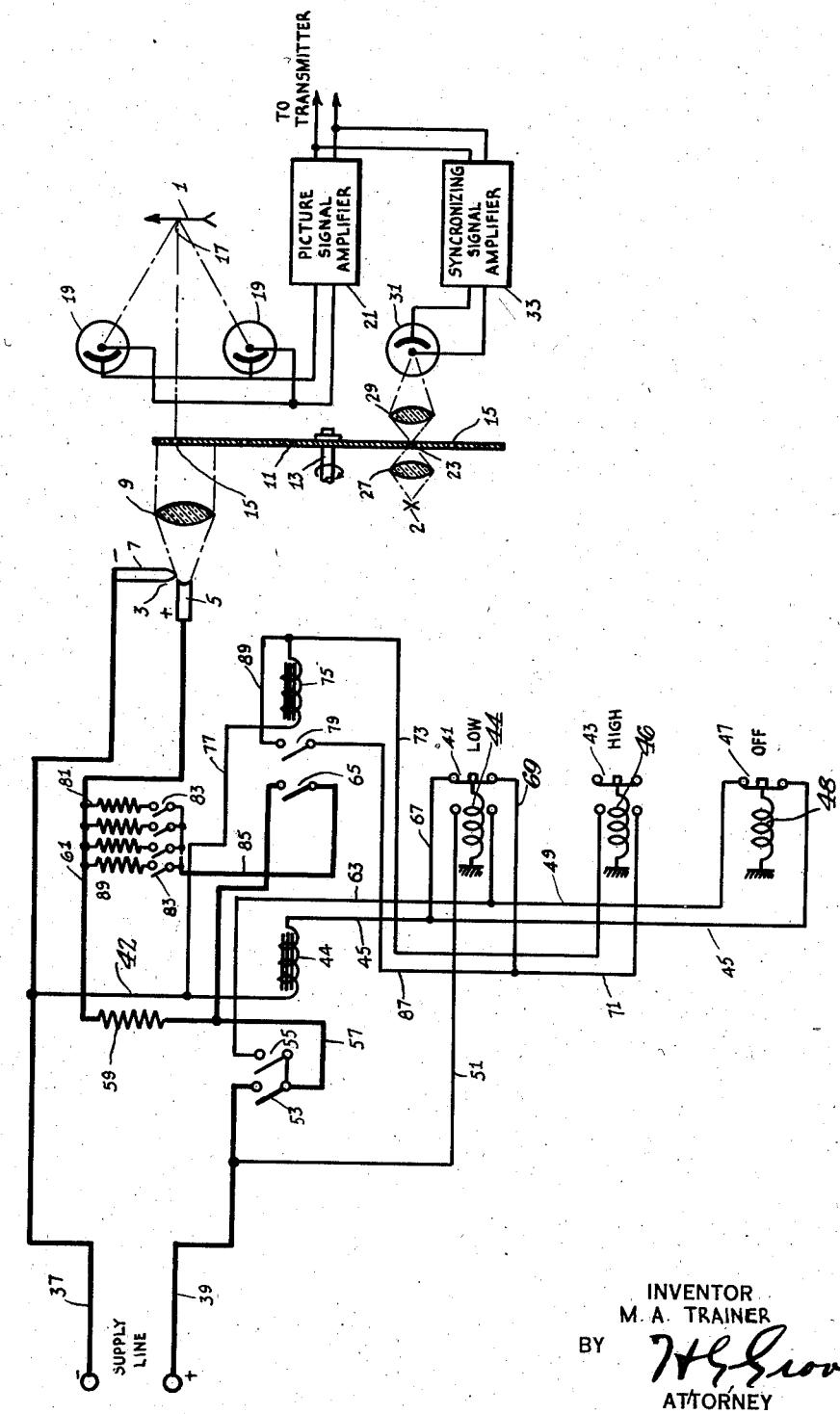
INVENTOR
M. A. TRAINER
BY
ATTORNEY Patented June 29, 1937

2,085,556

UNITED STATES PATENT OFFICE 2,085,556

TELEVISION SYSTEM

Merrill A. Trainer, Westmont, N. J., assignor to Radio Corporation of America, a corporation of Delaware Application August 6, 1932, Serial No. 627,682

3 Claims. (Cl. 176—12)

The present invention relates to television and particularly to the light sources used to illuminate the subject to be scanned for the electro-optical transmission of an image representation thereof.

In order to obtain a satisfactory image transmission, it is necessary either to illuminate the subject of which an image is to be transmitted with a relatively feeble light source for time periods of relatively long duration or to illuminate the subject of which an image is to be produced by an intense source of light existing for a relatively short time duration. Further, in accordance with the relative location of the subject to be scanned with respect to the element used to analyze the varying intensities of light and shadow on successive elemental areas of the subject may depend the necessary intensity of the scanning light for providing sufficient illumination so that a satisfactory image transmission may be accomplished.

The present invention, therefore, is directed to a light source, preferably an arc, used as the medium for illuminating the subject of which an image is to be transmitted, and this source will be herein described as cooperating with a scanning disk so as to illuminate the subject, of which an electro-optical image is to be reproduced, by the so-called "flying spot" of light.

It is frequently desirable, in order that there may be sufficient brilliance for a relatively infinitesimal time period on each elemental area of the subject to be scanned, to use an arc as the source of issuing light for illuminating the subject. It is frequently necessary to replace the carbons of the arc and, after replacement, it is necessary to "burn in" the arc, which is understood in the art as meaning the operation of the arc until it reaches a stable point and the crater size is substantially fixed. This necessitates a lower current through the arc than is desirable after the carbons have once been burned in.

Also, through the use of suitable controls, provision is made for adjusting the arc at will in accordance with the current consumption desired, or in accordance with the light intensity necessary for scanning at any predetermined time period.

From the foregoing, it is believed it will be seen that an object of the present invention is to provide a novel control system for operating the arc source used as an illuminating medium for scanning purposes at the point of transmission.

Other objects are, of course, to provide a system of control of the illumination medium which is simple in its construction and arrangement of parts; to provide a system which is substantially fool-proof in operation, easy and convenient to install and which will satisfy, with a minimum amount of difficulties, all of the conditions of operation above set forth.

Still other and further objects of the invention will become apparent and suggest themselves at once to those skilled in the art to which the invention is directed by reading the following specification and claims in connection with the accompanying drawing, wherein the single figure illustrates a preferred form which my invention may assume.

Referring now to the drawing, the subject 1, of which an electro-optical image representation is to be transmitted, is arranged to be illuminated from a source of light 3 which is produced by the arc comprising a pair of carbon or other suitable electrodes 5 and 7, the former designating, for example, the positive electrode and the latter the negative electrode. The light which issues from the arc 3 is then directed by a lens system 9 toward a rotary scanning element 11, for example. The scanning element 11 may rotate at any desired and appropriate speed, for instance 16 to 24 or more revolutions per second, upon a shaft 13. The scanning element is provided with a series of apertures 15 arranged about the periphery thereof in a spiral path so that the light generated by the arc 3 may be directed through the successive apertures to trace and illuminate each elemental area of the subject 1, at all points such as 17 for example. The light reflected from the subject at the point of illumination in well known manner is then reflected to a degree proportionate to the intensity of light and shadow at the particular elemental area illuminated so as to influence one or a plurality of photoelectric cells 19 whose output energy is amplified in any suitable amplifier 21 to represent an amplified picture signal. This energy may then be sent to a transmitter from which it is distributed to various receiving points by radio or wire communication channels.

To synchronize the movement of the reproducer (not shown) with the rate of scanning or analyzing the subject 1 at the transmitter, a separate series of apertures 23 may be provided on the scanning element and light from a source 25 passed therethrough by a suitable optical system comprising, for example, lenses 27 and 29 so as to influence a photoelectric tube 31 at regular periods corresponding to the end of scanning by the apertures 15 of each successive elemental strip of the subject 1 and the completion of scanning an entire series of elemental strips of the subject 1. The current impulses generated by the photoelectric tube 31 may then be amplified in any suitable manner in the amplifier 33 and also connected with the transmitter. It is preferable that the amplified signals representing both picture and synchronizing impulses be 180 degrees out of phase with respect to each other in order to provide for simpler separation of these signals at the points of reception, as has been disclosed by copending application of A. W. Vance, filed June 17, 1931, Serial No. 544,959 now issued in Great Britain as British Patent No. 395,499.

For the purpose of producing an intense light spot by means of the arc 3, energy is supplied thereto by way of conductors 37 and 39 at time periods when the controlling buttons 41 or 43 have been depressed so as to cause the completion of the circuit from the supply line terminals to the arc carbons. In the event that a low intensity arc is to be desired, as, for example, would be the case upon starting the system or where decreased light intensity is suitable, it will be observed that before the illumination system is rendered operative the negative carbon 7 of the arc 3 is connected directly with the conductor 37 but that the positive carbon 5 is disconnected from the supply line so that there is an open circuit. Therefore, to complete the circuit and thus cause the arc to strike, the "low" button 41 on the control panel is first depressed against the action of a spring 44 to contact the inner contact points. This closure of one of the buttons permits current to flow through circuit which includes the conductor 42, the winding 44 of the relay 44, 53, 55, the conductor 45, the break terminals of the "off" button 47, the conductor 49 and the make terminals of the "low" button and the supply line 39 through connection with the conductor 51. The arc power circuit now having been completed, it will be seen that the energization of winding 44 serves to close the switch 53, provided with a holding contact 55, and thus complete a circuit through the conductor 39, the switch 53, the conductor 57, resistor 59, which is of a value suitable to produce the low current through the arc, the conductor 61, the carbons 5 and 7 and the conductor 37. Current flow through this circuit once having been established, it will be seen that, even though the "low" button 41 is now released and is pressed over to its right side contacts by means of the spring, the holding circuit remains closed because of the holding contact 55 of the relay 44, 53, 55. This holding circuit may now be traced from the positive terminal of the supply line through the switch 53, the holding contact 55, the conductor 63, the right side contacts of the "off" button 47 and the conductor 45 through the winding 44 and back to the negative side of the supply line through the conductor 41.

Suppose now, for example, that a high current arc is desired, all that it is necessary to do to increase the current through the arc is to depress the "high" button 43 against the action of spring 46, or, as shown by the drawing, move this button to the left. This having been done, a current path is immediately established so as to close the member 65 of the relay 75, 65, 79 against this contact point. This current path may be considered as being from the positive terminals of the supply line through the contact arm 53, the holding contact 55 thereof, the conductor 63, the right side or upper contacts of the "off" button 47, the conductor 45 to a conductor 67, and thence through the back or right side contacts of the "low" button to conductor 69, from which the path continues to the conductor 71, the inside or left side contacts of the high intensity arc button 43 to conductor 73, the winding 75 to conductor 77, from which the current flows back to the negative side of the supply line through the conductor 41. Thus, it is seen that as the winding 75 becomes energized, the relay 75, 79, 65 and its associated holding contacts 79 is closed and that the switch arm 53 remains in closed position, as will hereinafter be explained.

In order to regulate the current taken by the arc, a plurality of parallelly-connected resistor elements 81, provided with switches 83 to cut in or out separate resistor elements, have been shown as connected with the positive terminal 5 of the arc through conductor 85. The current consumption of the arc will be increased upon depressing the "high" button 43, for instance, and then releasing the same because after the circuit has once been completed energizing the relay winding 75 the holding contact 79 of the relay 75, 79, 65 completes a circuit to keep the winding 75 energized. Such a holding current path is traced as follows: contact 53 with holding contact 55, conductor 63, the upper or right side terminals of the "off" button 47, the conductor 45, the conductor 67, the upper or right side contacts of the "low" button 41, conductor 69, conductor 87, holding contact 79, conductor 89, relay winding 75, conductors 77 and 41, and back to the negative terminal of the supply line.

It is seen from the above that as soon as either the "low" or "high" buttons 41 or 43 respectively is depressed, current flows through the arc 3. If the "low" button 41 is first depressed, then the system operates with a low current arc, and then if the "high" button 43 is depressed a high current arc is produced. If now, under such conditions, the "low" button is again depressed to provide for a low current arc, the contact arm 65 will open due to the fact that the circuit to energize the winding 75 was completed through the upper or right side contacts of the "low" button 41, and upon opening this circuit by depressing the "low" button or, in other words, moving it to its lower or left side contacts, as shown, the holding contact 79 moves to the position shown in the drawing. Thus, the circuit for the high current arc cannot be completed again until the "high" button 43 is again depressed.

Similarly, if the arc 3 is operating as either a low or high current arc and the "off" button 47 is depressed or moved to the lower or left side contacts in the opposite position from that shown, both windings 44 and 75 or merely winding 44, depending upon whether a high or a low current arc has been used, will open because the holding current for each winding in its energized position can flow only, as above shown, through the upper or right side contacts of the "off" button 47. Thus, by depressing the "off" button the arc 3 is instantly extinguished. Consequently, at the time when the disk or scanning element 11 is stopped in its rotational movement, the "off" button 47 is depressed so that the circuit for the arc will be broken, and the then stationary scanning element will be protected from excessive heat which would cause the element to become warped.

Many modifications and changes in the exact arrangement of the invention will, of course, suggest themselves at once to those skilled in the art to which the invention relates, and the invention is therefore to be regarded in its broad and generic sense as covering all modifications capable of being read into the hereinafter appended claims.

Having now described my invention, what I claim and desire to secure by Letters Patent of the United States, is as follows:

1. An illumination system comprising an arc source of light, a source of electrical energy means including an electrical circuit for connecting the source with the arc for operating the arc, a plurality of relay means included in said circuit for controlling the current supplied from the source to the arc during time periods when said relays are electrically energized, a circuit in shunt connection with said arc energy supply circuit, a plurality of manually operable spring-pressed switches included in said shunt circuit to control, during periods of operation thereof the energization of said relays to vary the current supplied to the arc from said source.

2. A lighting system including a source of energy, an arc source of light, an electrical circuit connected with the source to ignite the arc when the arc is connected with the source, a plurality of resistance elements included in the supply circuit between the source and the arc, a plurality of relays also connected in the circuit between the source and the arc whereby during periods of operation of the arc said resistance elements are selectively included and excluded from the energy supply circuit to regulate the current strength causing the arc to glow, and a shunt circuit including a plurality of manually operable switches and means included in said shunt circuit for permanently maintaining each selected operation condition of current supply to said arc, and means also included in said electrical circuit for rendering the entire system inoperative at predetermined time intervals.

3. In the system claimed in claim 1, one of said spring-pressed switches adapted to render the entire system inoperative and to disconnect the source of energy from the arc.

MERRILL A. TRAINER.